US007258350B2

(12) United States Patent
Kleine et al.

(10) Patent No.: US 7,258,350 B2
(45) Date of Patent: Aug. 21, 2007

(54) CHUCK FOR RECEIVING A ROTARY-PERCUSSION TOOL

(75) Inventors: Werner Kleine, Achim (DE); Werner Britten, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/995,741

(22) Filed: Nov. 22, 2004

(65) Prior Publication Data

US 2005/0110225 A1 May 26, 2005

(30) Foreign Application Priority Data

Nov. 26, 2003 (DE) ................................ 103 55 376

(51) Int. Cl.
*B23B 31/107* (2006.01)
*B25D 17/08* (2006.01)

(52) U.S. Cl. ........................................ 279/19; 279/19.3

(58) Field of Classification Search .................. 279/19, 279/19.3, 194.4, 19.5, 19.6, 81; 408/240; 175/414

See application file for complete search history.

(56) References Cited

U.S. PATENT DOCUMENTS 2,468,874 A * 5/1949 Hawkins ...................... 408/226
3,982,846 A * 9/1976 Steinbach .................... 408/226
4,106,573 A * 8/1978 Bailey ........................ 173/106
4,131,165 A * 12/1978 Wanner et al. ................ 173/48
4,619,460 A * 10/1986 Rohm .......................... 279/19
4,627,626 A * 12/1986 Rohm .......................... 279/145
4,655,651 A * 4/1987 Hunger et al. ............... 408/226
4,690,226 A * 9/1987 Schnizler et al. ............ 173/128
4,752,165 A * 6/1988 Wanner .................. 408/239 R
4,840,519 A * 6/1989 Kleine ......................... 408/226
5,286,145 A * 2/1994 Kleine ......................... 408/226
5,320,459 A * 6/1994 Kleine ......................... 408/226
5,326,199 A * 7/1994 Kleine et al. ............... 408/226
5,340,245 A * 8/1994 Bloechle et al. ............ 408/226
5,427,481 A * 6/1995 Selb et al. .................. 408/226
5,700,018 A * 12/1997 Bongers-Ambrosius et al. .......................... 279/19.4
5,706,903 A * 1/1998 Odendahl et al. ........... 173/104
5,785,448 A 7/1998 Courgen et al.
5,807,040 A * 9/1998 Bongers-Ambrosius et al. .......................... 408/226
5,984,596 A * 11/1999 Fehrle et al. ............... 408/226
6,059,296 A * 5/2000 Baeder ........................ 279/20

(Continued)

FOREIGN PATENT DOCUMENTS

DE 8433275 5/1986
DE 3843465 A1 * 6/1990
DE 39 41 646 A1 6/1991

(Continued)

*Primary Examiner*—Monica Carter
*Assistant Examiner*—Michael W. Talbot
(74) *Attorney, Agent, or Firm*—Abelman, Frayne & Schwab

(57) ABSTRACT

A chuck for receiving a working tool (2) rotable about a longitudinal axis (A) includes a receiving sleeve (3) having a guide surface (12) extending along the longitudinal axis (A) and at least three, axially extending, up to a free end surface (4) of the chuck (1), entraining grooves (5) located in front of the guide surface (12), arranged radially outside of the radial dimension (R) at angles of 0°, 120°, and 240°, and each having a central angle (α) defined with respect to the radial dimension (R) and amounting to at least 40°; and at least one locking member (6) radially displaceable over the radial dimension (R) and arranged between two circumferentially adjacent entraining grooves (5) and diametrically opposite a third entraining groove (5).

14 Claims, 2 Drawing Sheets

U.S. PATENT DOCUMENTS

| | | | | |
|---|---|---|---|---|
| 6,261,035 | B1 | 7/2001 | Moores, Jr. et al. | |
| 6,390,739 | B1 | 5/2002 | O'Banion | |
| 6,474,656 | B1 | 11/2002 | Thomas | |
| 6,543,558 | B1 * | 4/2003 | Hauptmann et al. | 175/320 |
| 6,588,993 | B2 * | 7/2003 | Omi | 408/226 |

FOREIGN PATENT DOCUMENTS

| | | |
|---|---|---|
| DE | 9604283 | 8/1997 |
| DE | 0206164 | 9/2003 |
| EP | 0584706 | 12/1998 |

* cited by examiner

CHUCK FOR RECEIVING A ROTARY-PERCUSSION TOOL

BACKGROUND OF THE INVENTION

1. Field of the Invention

The present invention relates to a chuck for receiving a rotary/percussion tool such as a drill bit, chissel, or bore-crown cutter.

2. Description of the Prior Art

Generally, a chuck for receiving a shank of a rotary-percussion working tool, e.g., such as disclosed in German Publication DE 3941 646 A1, has a shank-receiving sleeve with an inner cylindrical guide surface and with radially inwardly extending entraining webs, and radially inwardly displaceable locking members engageable in locking grooves of the tool shank, limiting axial displacement of the tool. Because of a high surface pressure, which is necessary for transmitting a predetermined torque, the radially inwardly projecting entraining webs are subjected to high wear which substantially reduces the service life of the chuck. A reduced wear of chucks is very important for their reliability, in particular, for those used in power tools used in mining for working concrete, mortar, and abrasive earth materials.

German Publication DE 38 43 465 A1 discloses a chuck with two entraining webs located radially inwardly with respect to guide surfaces, and with four, located radially outwardly with respect to the guide surfaces, entraining grooves which are axially offset relative to the entraining webs. The entraining grooves have a central angle of 45°. The inwardly located entraining webs are subjected to a strong wear which substantially reduces the chuck service life. Moreover, with four symmetrically distributed entraining grooves, the remaining central angle of 45° between the grooves, does not provide a sufficient guide space for the radially displaceable locking bodies which, therefore, are displaceable axially, which leads to an increased length of the chuck.

German Publications DE 196 04 283 A1 discloses a chuck having two entraining webs arranged radially inwardly with respect to the guide surfaces, and three, located radially outwardly with respect to the guide surfaces, entraining grooves symmetrically distributed over a circumference. With small entraining grooves having a central angle of less than 30, a suitable shank with small entrainable wings of less than 30 should be used. Because of the over-proportional dependency of the circumferential flexural strength of the entrainable wings on the surface pressure, and the elastic/plastic deformation of which leads to transformation of a surface contact to a linear contact that causes a substantial wear, with so small entrainable wings, the surface pressure and thereby a torque, which is transmitted by the surface area of the chuck, are limited.

Accordingly, an object of the present invention is a chuck having a reduced length and capable of transmitting high torques, without being subjected to a substantial wear.

SUMMARY OF THE INVENTION

This and other objects of the present invention, which will become apparent hereinafter, are achieved by providing a chuck for receiving a working tool rotable about a longitudinal axis and including a receiving sleeve open, with respect to its coaxial radial dimension, over its entire circumference and having a guide surface with the radial dimension and which extends along the longitudinal axis, and at least three, axially extending, up to a free end surface of the chuck, entraining grooves located in front of the guide surface of the chuck. The entraining grooves are arranged radially outside of the radial dimension at angles of 0°, 120°, and 240° and each has a central angle defined with respect to the radial dimension and amounting to at least 40°. The chuck further includes at least one locking member radially displaceable over the radial dimension and arranged circumferentially between two adjacent entraining grooves and diametrically opposite a third entraining groove.

With a central angle of entraining grooves being equal at least 40° and with a predetermined transmittable torque and predetermined contact surfaces of the entraining grooves, a shank with entrainable wings having an adequate flexural strength and which are not subjected to a noticeable elastic/plastic deformation, can be used.

The central groove angle of the entraining grooves or of the associated entrainable wings permits to improve substantially the wear-determining parameters of the circumferentially oriented contact surfaces available for transmission of the torque. This statement will be supported by a discussion below based on scaling laws.

During treatment of stones, the highest torque peaks M occur during blocking of a tool at a radial outer edge of the tool. The torque peaks M are proportional, at a predetermined hardness of a stone, to the radius of the tool or to a radial dimension R of the tool shank, so that M/R is constant. On the other hand, at a longitudinal or isogonal scaling of the cross-section of the inventive chuck for an associated tool shank, both the radial dimension R and the contact surface of the associated entrainable wings at a predetermined length are proportional to the scaling factor and, therefore, the transmitted, at a linear load q, torque M is proportional to a square of the radial dimension R, whereby $M \sim qR^2$. The maximal linear load of the contact surface pressure depends only on the material pairing. With selection of a substantially wear-free contact pair based on Hertian stresses generated by cooperation of an entraining groove of the chuck with a respective entrainable wing of the shank, the wing is viewed approximately as a rectangular, radially projecting, loaded flexural beam having a wing thickness $d \sim R$ and a wing height $h \sim R$. Thus, with a linear load q and a flexural invertia torque $I \sim d^3 \sim R^3$ for preventing a linear contact, the maximal allowable elastic/plastic deflection $y \sim qh^4/I \sim qR$ which remains constant.

From this follows, with the above-mentioned result, $M \sim qR^2 \sim R$, so that the provision of M/R=constant is met.

This free scalability of the necessary and wear-free transmittable torque M with respect to the radial dimension R is obtained only at the longitudinal and isogonal scaling of the cross-section and particularly depends on the entered with third power, proportionality $d \sim R$ that defines the constant central angle.

Advantageously, each entraining groove, which is expanded by a constant minimal gap dimension, optimally by of 0.8 mm, has a radial depth proportional to the radial dimension and amounting to from R/6 to R/3 and, optimally, being equal to R/4.5. Thereby, the wing height of the associated shank and which, together with the circumferentially oriented contact surface available for a torque transmission, is linearly correlated as an essential wear-determined parameter, is set, with respect to the material pairing of chucks and axially impact-loaded tools, in an abrasive active environment, within tribologically suitable range.

Advantageously, each entraining groove with the above-mentioned depth, has an axial length of at least 30 mm, so that the substantially wear-free transmittable, under Hertzian stress, torque, practically, is appropriately dimensioned.

Advantageously, a central angle of each entraining groove amounts maximum to 70°, whereby a sufficiently large central sleeve segment angle for guiding the radially displaceable locking member remains between two circumferentially adjacent entraining grooves. This angle at a symmetrically equal distribution of the entraining grooves amounts minimum to 50°.

Advantageously, the central sleeve segment angle between two circumferentially adjacent grooves amounts to from 50° to 80°, whereby a stop web is formed at a radial dimension R for stopping the locking member which has, with respect to the axial cross-section, a circular shape, and which engages in a locking groove that is formed between two entrainable wings of the shank. The locking member has a circular section that substantially fills the locking groove, and has a diameter that amounts to from 1.2R to 1.8R, and is advantageously equal to 1.4R.

Advantageously, the locking member has a shape of a roller and is oriented parallel to the chuck axis, whereby a high axial shear strength is achieved.

Advantageously, there is provided several, optimally three locking members, whereby high axial forces are transmitted from the chuck to the locked tool in particular upon withdrawal of the tool from a bore.

Advantageously, the guide inner surface has a machine-side guide end region arranged behind entraining grooves. The guide end region has an inner, circumferentially closed, cylindrical surface. The rear guide end region provides for transmission high bending torques to the associated, machine-side end of the guide surface of the shank.

Advantageously, the guide end region of the chuck has a length in a range from 1R to 3R, which is, advantageously, equal to 2R, whereby a seal can be provided within this length for preventing penetration of an abrasive dust in the chuck. As a seal, a rubber lip seal can be used.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
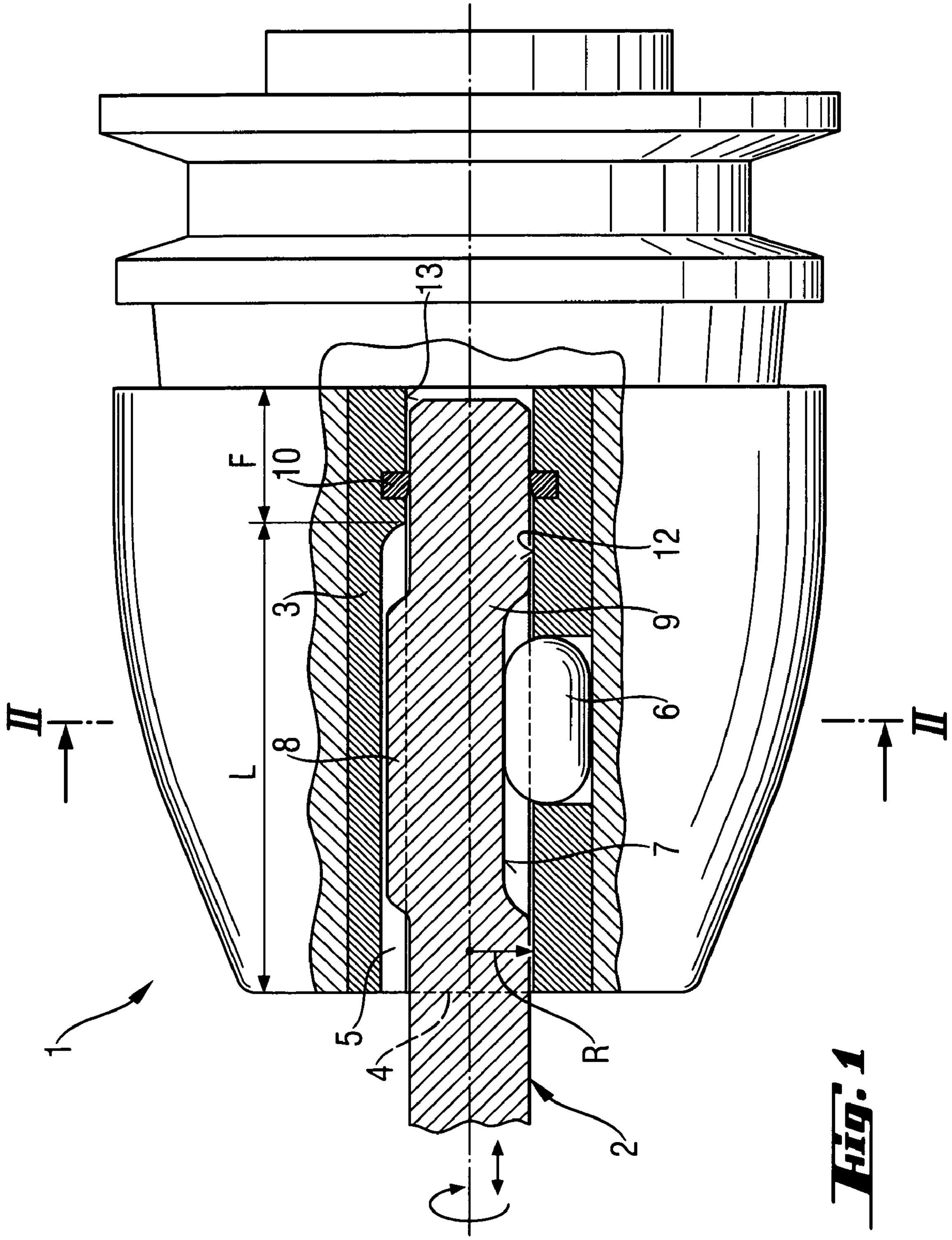
FIG. 1 a longitudinal, partially cross-sectional view of a chuck according to the present invention.

A chuck 1 according to the present invention, which is shown in FIG. 1, is designed for receiving a rotary-percussion tool 2 rotatable about a longitudinal axis A. The chuck 1 has a receiving sleeve 3 having a radial dimension or radius R of the opening formed thereby. The receiving sleeve 3 has an inner guide surface 12 extending along the axis A and having the same radial dimension R along its entire longitudinal extent. An axially extending entraining groove 5, which is provided in the receiving sleeve 3, adjoins the machine-tool or power tool side, guide end region 13. The entraining groove 5 is open at a free end surface 4 of the chuck 1. The entraining groove 5 has an axial length L of 40 mm. Within the longitudinal extent of the entraining groove 5, there is provided a roller-shaped, radially displaceable, locking member 6 oriented parallel to the axis A. The locking member 6 is diametrically arranged with respect to the entraining groove 5 and extends both within and outside of the radial dimension R in the locking position shown in the drawing. The machine-tool-or power tool-side, guide end region 13, which is located behind the entraining groove 5, has a circumferentially closed, inner cylindrical surface with a guide length F of 2R. In order to prevent penetration of an abrasive dust into the chuck 1, there is provided in the guide end region 13 sealing means 10 in form of a rubber seal lip.

Figure 3:
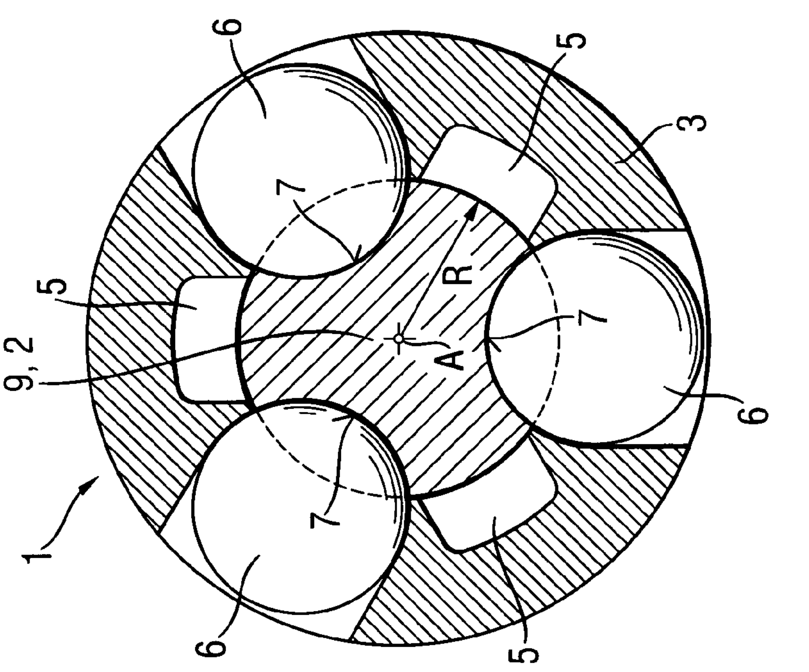
FIG. 3 a cross-sectional view similar to that of FIG. 2 of another embodiment of a chuck according to the present invention.
Figure 2:
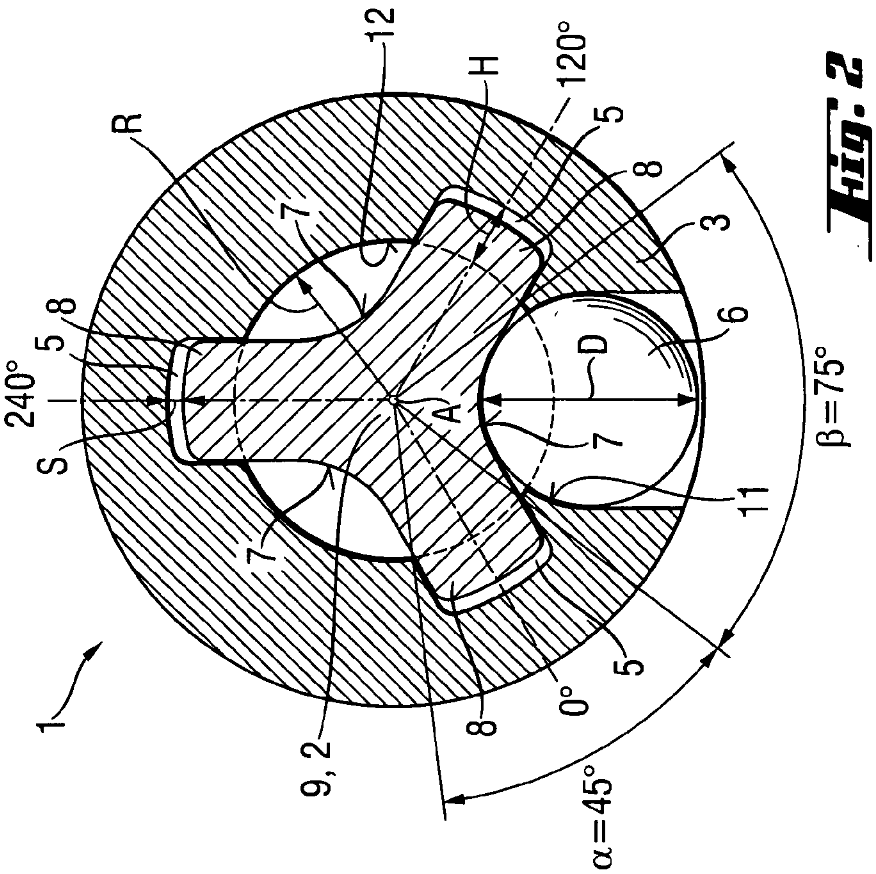
FIG. 2 a cross-sectional view along line II-II of the chuck shown in FIG. 1.

As shown in FIG. 2, the chuck 1 has three inner entraining grooves 5 which extend radially, rotationally symmetrically outside of the radial dimension R at angles of 0°, 120°, and 240°, and a single locking member 6 displaceable radially within the radial dimension R. The locking member 6 is located between two adjacent groove 5 and diametrically opposite the third groove 5. A central groove angle (α), which is defined with respect to the radial dimension R, amounts to 45°. A respective remaining central angle β of a sleeve segment for guiding the radially displaceable, locking member 6 amounts to 75°. Each entraining groove 5 has a radial depth H, with the ratio of the depth H to the radial dimension R amounting substantially to 1/4.5. The radial depth H encompasses a minimal gap dimension S of 0.8 mm. The roll-shaped locking member 6 having a diameter D of 1.4R abuts, in its radially inner locking position, a stop web 11 that extends up to the radial dimension R, with its locking circular section filling an associated locking groove 7 between two wings 8 of a shank 9 of a working tool 2. In the embodiment shown in FIG. 3, there are provided three ball-shaped locking members 6 circumferentially symmetrically arranged diametrically opposite the respective entraining grooves 5. Each of the locking member 6 has its locking circular section received in a respective locking groove 7 of the shank 9. Because the shank 9 has an outer diameter corresponding to the radial dimension R, it does not extend into the entraining grooves 5 which, thereby, remain free. In this embodiment, the rotation of the tool 2 is insured only by the locking members 6 which engage in the respective locking grooves 7 of the shank 9.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A chuck for receiving a working tool (2) rotatable about a longitudinal axis (A), the chuck (1) comprising a receiving sleeve (3) open, with respect to a coaxial radial dimension (R) thereof, over a circumference thereof, and having a guide surface (12) extending along the longitudinal axis (A) with a radial dimension (R), and at least three, axially extending, up to a free end surface (4) of the chuck (1), entraining grooves (5) located in front of the guide surface (12), the entraining grooves (5) being arranged radially outside of the radial dimension (R) at angles of 0°, 120°, and 240° and each having a central angle (α) amounts maximum to 70° defined with respect to the radial dimension (R); and at least one locking member (6) radially displaceable over the radial dimension (R) and arranged between two circumferentially adjacent entraining grooves (5) and diametrically opposite a third entraining groove (5).

2. A chuck according to claim 1, wherein each entraining groove (5), which is expanded by a constant minimal gap dimension (S), has a radial depth (H) substantially proportional to the radial dimension (R) and amounting to from R/6 to R/3.

3. A chuck according to claim 2, wherein the radial depth (H) of each entraining groove (5) amounts to R/4.5, and the minimal gap dimension (S) amounts to about 0.8 mm.

4. A chuck according to claim 2, wherein each entraining groove (5) has an axial length at least 30 mm.

5. A chuck according to claim 4, wherein each entraining groove (5) has an axial length amounting to 40 mm.

6. A chuck according to claim 1, wherein a central angle (β) between two circumferentially adjacent entraining grooves (5) equals from 50° to 80°.

7. A chuck according to claim 1, wherein the locking member (6) has a circular, with respect to an axis thereof, cross-section.

8. A chuck according to claim 7, wherein the locking member (6) has a diameter in a range from 1.2R to 1.8R.

9. A chuck according to claim 7, wherein the locking member (6) is formed as a roller oriented parallel to the longitudinal axis (A).

10. A chuck according to claim 1, comprising a plurality of locking members (6).

11. A chuck according to claim 10, comprising three locking members (6).

12. A chuck according to claim 1, comprising a machine-side, guide end region (13) arranged behind the entraining grooves (5) and having an inner, circumferentially closed, cylindrical surface.

13. A chuck according to claim 12, wherein the guide end region (13) had a guide length (F) in a range from 1R to 3R.

14. A chuck according to claim 13, wherein the guide length (F) amounts to 2R.

* * * * *